United States Patent [19]
Park et al.

[11] Patent Number: 6,019,656
[45] Date of Patent: Feb. 1, 2000

[54] METHOD OF FABRICATING A FIELD EMISSION DEVICE BY USING CARBON NANO-TUBES

[75] Inventors: Kang Ho Park, Daejon; Wan Soo Yun, Kyungki-Do; Jeong Sook Ha, Daejon, all of Rep. of Korea

[73] Assignee: Electronics and Telecommunications Research Institute, Daejon, Rep. of Korea

[21] Appl. No.: 09/145,327

[22] Filed: Sep. 1, 1998

[30] Foreign Application Priority Data

Nov. 29, 1997 [KR] Rep. of Korea .................... 97-64812

[51] Int. Cl.[7] .......................................... H01J 9/02
[52] U.S. Cl. ................................................ 445/24
[58] Field of Search .................................. 445/24

[56] References Cited

U.S. PATENT DOCUMENTS 5,637,950  6/1997  Jin et al. .
5,889,363  3/1999  Beeteson et al. ................... 313/495

*Primary Examiner*—Kenneth J. Ramsey
*Attorney, Agent, or Firm*—Jacobson, Price, Holman & Stein, PLLC

[57] ABSTRACT

This invention relates to a fabrication method of field emission device by using a carbon nano-tubes and, more particularly, to a fabrication method of field emission device by using the carbon nano-tubes, gathering much attention as a new material, as a field emission tips which have thin and stiff edges so that a threshold voltage required for emitting electron of the field emission device is to be lowered drastically. This invention provides a fabrication method of the field emission device using a thermally and chemically stable carbon nano-tubes, which have very stiff and nanometer-thick edges, as a field emission tips so that the field emission device using the carbon nano-tubes as the tips, which have an excellent electron beam coherency, can emit electrons at a very low voltage and very stable during a long period.

2 Claims, 1 Drawing Sheet

METHOD OF FABRICATING A FIELD EMISSION DEVICE BY USING CARBON NANO-TUBES

BACKGROUND OF INVENTION

1. Field of the Invention

This invention relates to a method of fabricating a field emission device by using a carbon nano-tube, gathering much attention as a new material, as a field emission tips which have a thin and stiff edges so that a threshold voltage required for emitting electrons of the field emission device can be lowered drastically and a coherency of electron beam of the field emission display device can be increased.

2. Description of the Prior Art

The field emission device applied to a microwave device, flat panel display device and sensor device uses the stiff edge tips as a cathode which can emit electrons by applying a voltage to an anode, gate electrode, because an electric field distribution is increased around an edge area of the tips. An emissive current and threshold voltage of the field emission device depend on a stiffness of the tips and an work function of the tip material. Therefore, conventionally, to achieve a sub-micron stiff silicon tips, a complicated and a sophisticated micro-machining techniques for a fabrication of three dimensional structures such as tips by repeatedly depositing and etching processes has been used.

SUMMARY OF THE INVENTION

It is an object of the present invention to provide a method of fabricating a field emission device using a carbon nano-tubes as a tips which have very low threshold voltage required for emitting electrons so that it has low power consumption and long life time, and also to provide a simple fabrication process steps to make a stiff edged tips of the field emission device.

In order to achieve the object of this invention, a fabrication process of the field emission device using the carbon nano-tubes includes a step for depositing silicon oxide layer on a silicon substrate, a step for making a micro-array structure of a circle type micro-holes by etching a selected area of the silicon substrate and the silicon oxide layer, a step for filling the holes with the carbon nano-tubes vertically due to a difference between a combining force of a bottom of the holes and a surface of the silicon oxide layer using a solution containing the carbon nano-tubes, a step for making the field emission tips by cleaning process for eliminating the carbon nano-tubes which were not vertically filled in the holes, and a step for making a fluorescent plate and a grids at a certain distance from the field emission tips.

This invention provides a fabrication method of the field emission device using a carbon nano-tubes, recently gathering much attention as a new material, for a field emission tips which have very thin and stiff edges so that the field emission display device using the tips can make a high electric field easily around the tips, emit electrons at a very low voltage, and be fabricated with very simple process steps, and also have an excellent electron beam coherency.

BRIEF DESCRIPTION OF THE DRAWINGS

The invention is the best understood from the following detailed description when read in conjunction with the accompanying drawings, in which.

Similar reference characters refer to similar parts in the several views of the drawings.

DETAILED DESCRIPTION OF THE INVENTION

The present invention will be described below with reference to the accompanying drawings.

Figure 1A:
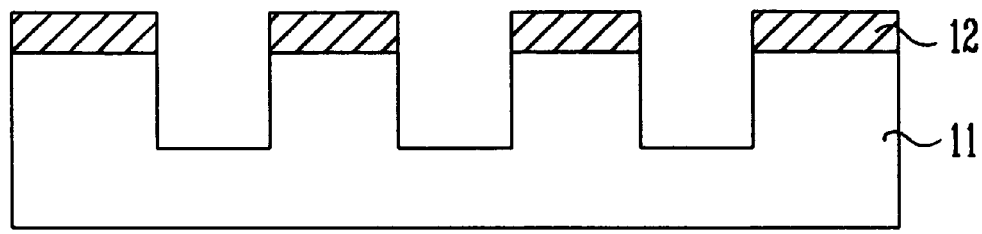
FIGS. 1a–1c are cross sectional views for explaining a fabrication process of a field emission device using a carbon nano-tubes according to the present invention.
Figure 1B:
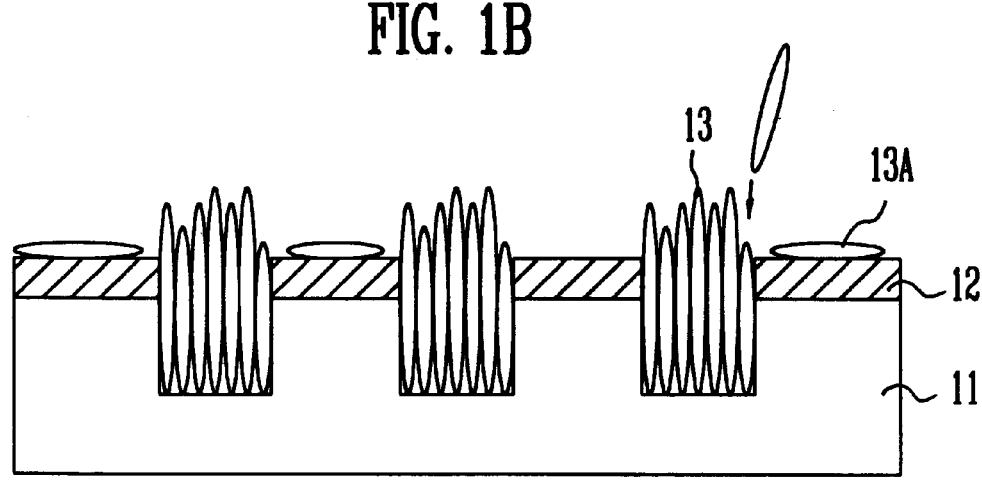
Figure 1C:
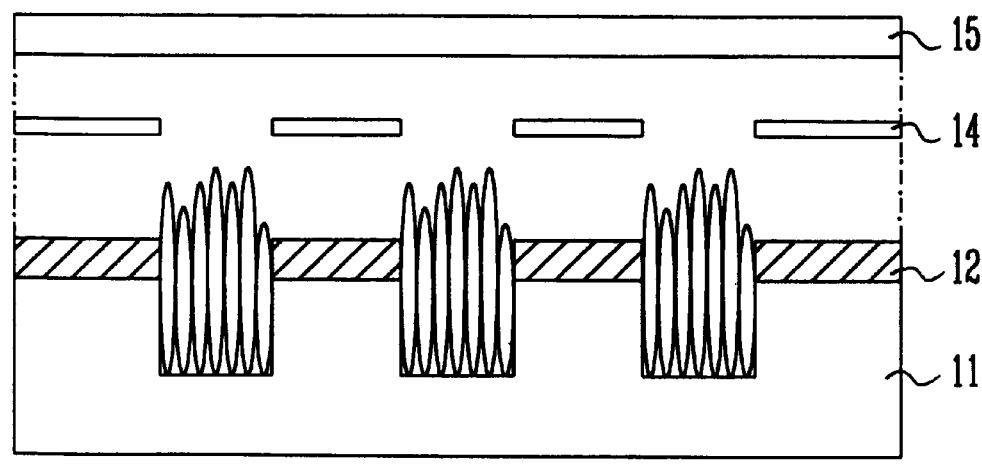

FIGS. 1a–1c are cross sectional views for explaining a fabrication process of a field emission device using a carbon nano-tubes according to the present invention.

As shown in FIG. 1a, a sub-micron thick silicon oxide layer 12 is deposited on a silicon substrate 11. Then, a micro-array structure of a holes is fabricated by forming a micro-sized holes on the silicon substrate by an etching process.

After solving a carbon nano-tubes material in a solution, the silicon substrate 11 soaks in the solution and the solution and the substrate is shaked so that the micro-length carbon nano-tubes fill the holes. As shown in FIG. 1b, the carbon nano-tubes fill the holes vertically as do pencils in a pencil box because of a geometrical function of the micro-array structure and a difference between a combining force of a surface of the silicon oxide layer and a bottom of the holes fabricated on the silicon substrate. After repeat the above process several times, a carbon nano-tubes which is not filled vertically in the holes are eliminated with a flowing solution.

As shown in FIG. 1c, after finishing the fabrication process of the field emission tip structure by using the carbon nano-tubes, a grids 14 and a fluorescent plate 15 are fabricated to complete a field emission device. Compared with a tip structure of a field emission device made by conventional method, the tips of the carbon nano-tubes made by the above method has a low threshold voltage required for emitting electrons by forming a high electric field distribution around the edge of the tips easily even at a relatively low voltage due to a nano-meter-sized stiff edge tips of the carbon nano-tubes, a low energy of ions collided with the tips at a low voltage applied, and a thermal stability so that the structure of the tip is not changed even after long period usage. Moreover, it can reduce a vacuum cost because the tip can emit the electrons at a low voltage even in a low vacuum condition and increase drastically a coherency of an electron beam because of the stiff and thin edge tips of the carbon nano-tubes.

As explained above, consequently, the field emission device of this invention provides a very simple fabrication process, a low power consumption, a low cost for storing vacuum condition, long life time, and an increased coherency of an electron beam.

Although the invention is illustrated and described herein embodied as a field emission device specially fabricated by using a carbon nano-tubes as a tip, the invention is nevertheless not intended to be limited to the details as shown. Rather, various modifications may be made in the details within the scope and range of equivalents of the claims and without departing from the spirite invention.

What is claimed is:

1. A method of fabricating a field emission device, comprising the steps of:

forming a silicon oxide layer on a silicon substrate;

forming a plurality of holes by etching selected portions of said silicon oxide layer on a silicon substrate;

filling said holes with carbon nano-tube, in which the carbon nanotube is vertically and reqularly filed in said holes;

forming field emission tips by eliminating the carbon nanotube which is not filled in said holes; and sequentially forming a grids and a fluorescent plate on a portion spaced from said field emission tips.

2. The method of claim 1, wherein said carbon nano-tubes have a nano-meter-sized radius of curvature edges.

* * * * *